US011449803B2

(12) United States Patent
Iyer et al.

(10) Patent No.: US 11,449,803 B2
(45) Date of Patent: Sep. 20, 2022

(54) DATA CLASS ANALYSIS METHOD AND APPARATUS

(71) Applicant: Intel Corporation, Santa Clara, CA (US)

(72) Inventors: Darshan Iyer, Portland, OR (US); Nilesh K. Jain, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/992,008

(22) Filed: Aug. 12, 2020

(65) Prior Publication Data
US 2021/0201200 A1 Jul. 1, 2021

Related U.S. Application Data

(63) Continuation of application No. 15/394,711, filed on Dec. 29, 2016, now Pat. No. 10,755,198.

(51) Int. Cl.
*G06N 20/00* (2019.01)
*G06K 9/62* (2022.01)
(Continued)

(52) U.S. Cl.
CPC ............ *G06N 20/00* (2019.01); *G06K 9/628* (2013.01); *G06K 9/6231* (2013.01); *G06V 40/28* (2022.01);
(Continued)

(58) Field of Classification Search
CPC ...... G06F 16/285; G06F 16/35; G06F 16/355; G06F 17/16; G06K 9/00355;
(Continued)

(56) References Cited

U.S. PATENT DOCUMENTS 5,832,182 A * 11/1998 Zhang ................... G06F 16/285
706/50
7,185,001 B1 * 2/2007 Burdick ................ G06F 16/345
(Continued)

FOREIGN PATENT DOCUMENTS

CN 102750545 A 10/2012

OTHER PUBLICATIONS

Tajfel, Henri, and Alan L. Wilkes. "Classification and quantitative judgement." British journal of psychology 54.2 (1963): 101-114. (Year: 1963).*

(Continued)

*Primary Examiner* — Dennis Truong
(74) *Attorney, Agent, or Firm* — Hanley, Flight & Zimmerman, LLC

(57) ABSTRACT

Methods, apparatus, and system determine if a data class in a plurality of data classes is separable, such as by determining an average intra-class similarity within each data class, inter-class similarity across all data classes in the plurality of data classes, and determining separability based on the average intra-class similarity relative to the inter-class similarity. Data classes determined to be highly variable may be removed. Pair(s) of data classes not separable from one another may be combined into one class or one of the data classes may be dropped. A hardware accelerator, which may comprise artificial neurons, accelerate performance of the data analysis.

21 Claims, 12 Drawing Sheets

(51) Int. Cl.
*G06K 9/00* (2022.01)
*G06F 16/35* (2019.01)
*G06F 17/16* (2006.01)
*G06N 3/063* (2006.01)
*G06V 40/20* (2022.01)
*G06F 16/28* (2019.01)

(52) U.S. Cl.
CPC ............ *G06F 16/285* (2019.01); *G06F 16/35* (2019.01); *G06F 16/355* (2019.01); *G06F 17/16* (2013.01); *G06K 9/6215* (2013.01); *G06K 9/6218* (2013.01); *G06N 3/063* (2013.01)

(58) Field of Classification Search
CPC .... G06K 9/6231; G06K 9/628; G06K 9/6215; G06K 9/6218; G06N 20/00; G06N 3/063
See application file for complete search history.

(56) References Cited

U.S. PATENT DOCUMENTS

| | | | | |
|---|---|---|---|---|
| 9,336,302 | B1* | 5/2016 | Swamy | G06F 16/355 |
| 10,755,198 | B2 | 8/2020 | Iyer et al. | |
| 2003/0055799 | A1* | 3/2003 | Starzyk | G06N 3/088 706/27 |
| 2003/0097384 | A1* | 5/2003 | Hu | G06F 40/177 715/234 |
| 2003/0217335 | A1* | 11/2003 | Chung | G06F 16/355 715/206 |
| 2005/0114382 | A1* | 5/2005 | Lakshminarayan | G06K 9/6218 |
| 2007/0022065 | A1* | 1/2007 | Hatano | G06K 9/6219 706/16 |
| 2007/0271279 | A1* | 11/2007 | Acharya | G06N 5/022 |
| 2010/0104199 | A1* | 4/2010 | Zhang | G08G 1/165 382/199 |
| 2010/0220906 | A1* | 9/2010 | Abramoff | G06T 7/0014 382/130 |
| 2011/0055140 | A1* | 3/2011 | Roychowdhury | G06K 9/6223 706/54 |
| 2011/0249897 | A1* | 10/2011 | Chaki | G06K 9/34 382/177 |
| 2015/0117766 | A1* | 4/2015 | Tickoo | G06K 9/6235 382/160 |
| 2016/0063097 | A1* | 3/2016 | Brown | G06K 9/6254 707/737 |
| 2016/0078359 | A1* | 3/2016 | Csurka | G06K 9/6215 706/12 |
| 2016/0299961 | A1* | 10/2016 | Olsen | G06K 9/6219 |
| 2017/0109653 | A1* | 4/2017 | Agarwal | H04Q 9/00 |
| 2017/0111245 | A1* | 4/2017 | Ishakian | G06Q 10/0633 |
| 2017/0177995 | A1* | 6/2017 | Hillar | G06F 16/35 |
| 2018/0189376 | A1* | 7/2018 | Iyer | G06K 9/6231 |

OTHER PUBLICATIONS

Dong, Jian, et al. "Subcategory-aware object classification." Proceedings of the IEEE conference on computer vision and pattern recognition. 2013. (Year: 2013).*

J. Huang, Q. Qiu, R. Calderbank, M. Rodrigues and G. Sapiro, "Alignment with intra-class structure can improve classification," 2015 IEEE International Conference on Acoustics, Speech and Signal Processing (ICASSP), 2015, pp. 1921-1925, doi: 10.1109/ICASSP.2015.7178305. (Year: 2015).*

Wang, X., et al. "Optimal Cluster Selection Based on Fisher Class Separability Measure," 2005 American Control Conference Jun. 8-10, 2005. Portland, OR, USA, pp. 1929-1934.

United States Patent Office—Office Action dated Aug. 20, 2019 from U.S. Appl. No. 15/394,711, 13 pages.

United States Patent Office—Final Office Action dated Jan. 28, 2020 from U.S. Appl. No. 15/394,711, 14 pages.

United States Patent and Trademark Office, "Notice of Allowance and Fee(s) Due," issued in connection with U.S. Appl. No. 15/394,711, dated Apr. 20, 2020, 5 pages.

United States Patent and Trademark Office, "Corrected Notice of Allowability," issued in connection with U.S. Appl. No. 15/394,711, dated Jun. 12, 2020, 2 pages.

* cited by examiner

| | | | | | | | | |
|---|---|---|---|---|---|---|---|---|
| 14 | 38 | 144 | 8 | 82 | 18 | 32 | 0 | 0 |
| 13 | 43 | 145 | 4 | 79 | 23 | 34 | 0 | 0 |
| 13 | 43 | 140 | 5 | 78 | 23 | 31 | 0 | 0 |
| 15 | 38 | 132 | 9 | 83 | 20 | 28 | 0 | 0 |
| 14 | 39 | 138 | 7 | 82 | 21 | 23 | 0 | 0 |
| 13 | 45 | 138 | 5 | 79 | 23 | 31 | 0 | 0 |
| 13 | 44 | 141 | 5 | 75 | 23 | 30 | 0 | 0 |
| 13 | 167 | 159 | 3 | 38 | 86 | 113 | 60 | 1 |
| 19 | 165 | 159 | 1 | 30 | 92 | 98 | 66 | 1 |
| 10 | 170 | 164 | 2 | 32 | 88 | 103 | 66 | 1 |
| 21 | 173 | 158 | 1 | 33 | 97 | 111 | 77 | 1 |
| 10 | 180 | 165 | 3 | 30 | 91 | 124 | 77 | 1 |
| 19 | 150 | 165 | 1 | 42 | 84 | 105 | 77 | 1 |
| 10 | 161 | 173 | 2 | 32 | 81 | 117 | 66 | 1 |
| 152 | 42 | 175 | 18 | 186 | 150 | 158 | 99 | 2 |
| 142 | 39 | 145 | 10 | 175 | 142 | 120 | 94 | 2 |
| 136 | 39 | 161 | 13 | 172 | 134 | 136 | 155 | 2 |
| 138 | 43 | 165 | 14 | 172 | 137 | 143 | 188 | 2 |
| 135 | 36 | 149 | 19 | 173 | 130 | 125 | 254 | 2 |
| 132 | 28 | 168 | 9 | 171 | 127 | 110 | 160 | 2 |
| 14 | 17 | 197 | 28 | 90 | 4 | 21 | 0 | 3 |
| 22 | 43 | 135 | 19 | 91 | 26 | 37 | 0 | 3 |
| 23 | 29 | 160 | 9 | 91 | 24 | 30 | 0 | 3 |
| 19 | 17 | 207 | 16 | 92 | 12 | 23 | 0 | 3 |
| 29 | 36 | 133 | 18 | 95 | 33 | 32 | 0 | 3 |
| 21 | 46 | 125 | 32 | 91 | 29 | 34 | 0 | 3 |
| 23 | 41 | 132 | 18 | 94 | 28 | 37 | 0 | 3 |
| 104 | 1 | 169 | 20 | 159 | 90 | 64 | 0 | 4 |
| 105 | 0 | 145 | 12 | 160 | 91 | 64 | 0 | 4 |
| 106 | 4 | 250 | 70 | 160 | 94 | 73 | 0 | 4 |
| 105 | 2 | 184 | 13 | 159 | 92 | 66 | 0 | 4 |
| 104 | 2 | 153 | 26 | 159 | 90 | 65 | 0 | 4 |
| 105 | 0 | 157 | 8 | 160 | 91 | 64 | 0 | 4 |
| 105 | 0 | 166 | 9 | 160 | 91 | 64 | 0 | 4 |
| 12 | 43 | 136 | 12 | 82 | 22 | 26 | 0 | 0 |
| 10 | 50 | 141 | 11 | 79 | 22 | 30 | 0 | 0 |
| 12 | 41 | 130 | 17 | 84 | 19 | 26 | 0 | 0 |
| 11 | 31 | 126 | 22 | 86 | 13 | 20 | 0 | 0 |
| 12 | 35 | 125 | 18 | 85 | 18 | 22 | 0 | 0 |
| 13 | 43 | 134 | 15 | 83 | 22 | 24 | 0 | 0 |
| 14 | 42 | 142 | 10 | 83 | 25 | 27 | 0 | 0 |
| 16 | 169 | 166 | 2 | 40 | 100 | 107 | 60 | 1 |
| 16 | 177 | 162 | 3 | 36 | 96 | 111 | 72 | 1 |
| 14 | 173 | 163 | 3 | 35 | 93 | 108 | 77 | 1 |
| 13 | 164 | 164 | 3 | 37 | 87 | 103 | 55 | 1 |
| 10 | 133 | 169 | 3 | 44 | 68 | 87 | 22 | 1 |
| 13 | 161 | 165 | 4 | 41 | 86 | 102 | 72 | 1 |
| 14 | 171 | 162 | 3 | 36 | 96 | 99 | 77 | 1 |

Fig.8

```
function CheckClassSeparability()

data = load('FeatureMatrix_Activity.csv'); labelCol = 9;

class = unique(data(:,labelCol));
nClass = length(class);

corrMatrix_individual = zeros(nClass,nClass);
corrMatrix_individual_normalized = zeros(nClass,nClass);
corrMatrix_avg = zeros(nClass,nClass);
corrMatrix_avg_normalized = zeros(nClass,nClass);

for i=1:nClass
   class_i_data = data(data(:,labelCol) == class(i), 1:end-1);
   corrMatrix_individual(i,i) = selfCorr_individual(class_i_data);
   corrMatrix_individual_normalized(i,i) = corrMatrix_individual(i,i);
   corrMatrix_avg(i,i) = selfCorr_avg(class_i_data);
   corrMatrix_avg_normalized(i,i) = corrMatrix_avg(i,i);

for j=i+1:nClass
     if (j ~= i)
        class_j_data = data(data(:,labelCol) == class(j), 1:end-1);
        corrMatrix_individual(i,j) = crossCorr_individual(class_i_data, class_j_data);
        corrMatrix_individual_normalized(i,j) =
corrMatrix_individual(i,j)/corrMatrix_individual(i,i);

corrMatrix_avg(i,j) = crossCorr_avg(class_i_data, class_j_data);
        corrMatrix_avg_normalized(i,j) = corrMatrix_avg(i,j)/corrMatrix_avg(i,i);
     end
   end
end return
```

Fig.9A

```
function avgCorrValue = selfCorr_individual(data)

N = size(data,1);
corrValue = zeros(1,N*(N-1)/2);

cnt = 0;
for i=1:N
   for j=i+1:N
      if (j~=i)
         cnt = cnt+1;
         r = corrcoef(data(i,:), data(j,:));
         corrValue(cnt) = r(2);
      end
   end
end avgCorrValue = mean(corrValue);

return
```

Fig.9B

```
function avgCorrValue = crossCorr_individual(data1, data2)

N1 = size(data1,1);
N2 = size(data2,1);

corrValue = zeros(1,N1*N2);
cnt = 0;
for i=1:N1
   for j=1:N2
      cnt = cnt+1;
      r = corrcoef(data1(i,:), data2(j,:));
      corrValue(cnt) = r(2);
   end
end avgCorrValue = mean(corrValue);

return
```

Fig.9C

```
function avgCorrValue = selfCorr_avg(data)

N = size(data,1);
corrValue = zeros(1,N);

average = mean(data);

for i=1:N
   r = corrcoef(data(i,:), average);
   corrValue(i) = r(2);
end avgCorrValue = mean(corrValue);

return
```

Fig.9D

DATA CLASS ANALYSIS METHOD AND APPARATUS

RELATED APPLICATIONS

This application is a continuation of, and claims priority to U.S. application Ser. No. 15/394,711 filed on Dec. 29, 2016, entitled "DATA CLASS ANALYSIS METHOD AND APPARATUS", now U.S. Pat. No. 10,755,198, the contents of which are hereby incorporated by reference herein in their entirety for all purposes.

FIELD

The present disclosure relates to the field of computing device, in particular to analysis of data class separability and a device for performing such analysis.

BACKGROUND

Data collection can be a resource intensive process. Data collection often involves preliminary stages in which planning occurs regarding what data to collect and how to collect it. Incorrect assumptions may be made when planning data collection; these incorrect assumptions may result in significant costs, such as of time and money, delay of a project while data is (re)collected, cancellation of a project, and inconclusive results.

For example, a project may involve tracking the hand motions of people who use sign language. The project may involve attempting to determine the amount of energy expended to sign different symbols in American Sign Language. During the planning stage, planners may assume that it is possible to attach inertial measurement units ("IMUs") to the wrists of signers and that it is possible to distinguish different symbols based on measurements from the IMUs as the signers sign different characters. Preliminary measurements with one person may even have found that it is possible to reliably distinguish different symbols based on measurements from the IMUs. Using this data source may be very preferable, because IMUs are inexpensive and because, if the test design works, the IMUs can be used to measure both which symbol is being signed as well as to measure energy expenditure. This preference may bias the researchers as they plan for data collection.

However, if no preliminary test had been done or if the preliminary test was not representative (for example, the one person who was sampled may have relatively exaggerated motion, compared to an average signer), data from the project may be turn out to be inconclusive. For example, it may turn out that certain symbols cannot be reliably distinguished when signs are measured from a large group of people. Without being able to distinguish symbols, the resulting data may be worthless or may not be able to answer questions of the project. If there is sufficient budget and time, the project may be repeated using an experimental design which is capable of distinguishing symbols. However, if the first experimental design used up available budget and time, it may no longer be possible to repeat the project with an improved data collection design.

BRIEF DESCRIPTION OF THE DRAWINGS

FIG. 8 is an example of a set of signals to be processed according to embodiments of the disclosure herein.

FIG. 9A is an example of a first set of pseudocode to implement certain aspects of a separability module.

FIG. 9B is an example of a second set of pseudocode to implement certain aspects of a separability module.

FIG. 9C is an example of a third set of pseudocode to implement certain aspects of a separability module.

FIG. 9D is an example of a fourth set of pseudocode to implement certain aspects of a separability module.

Figure 1:
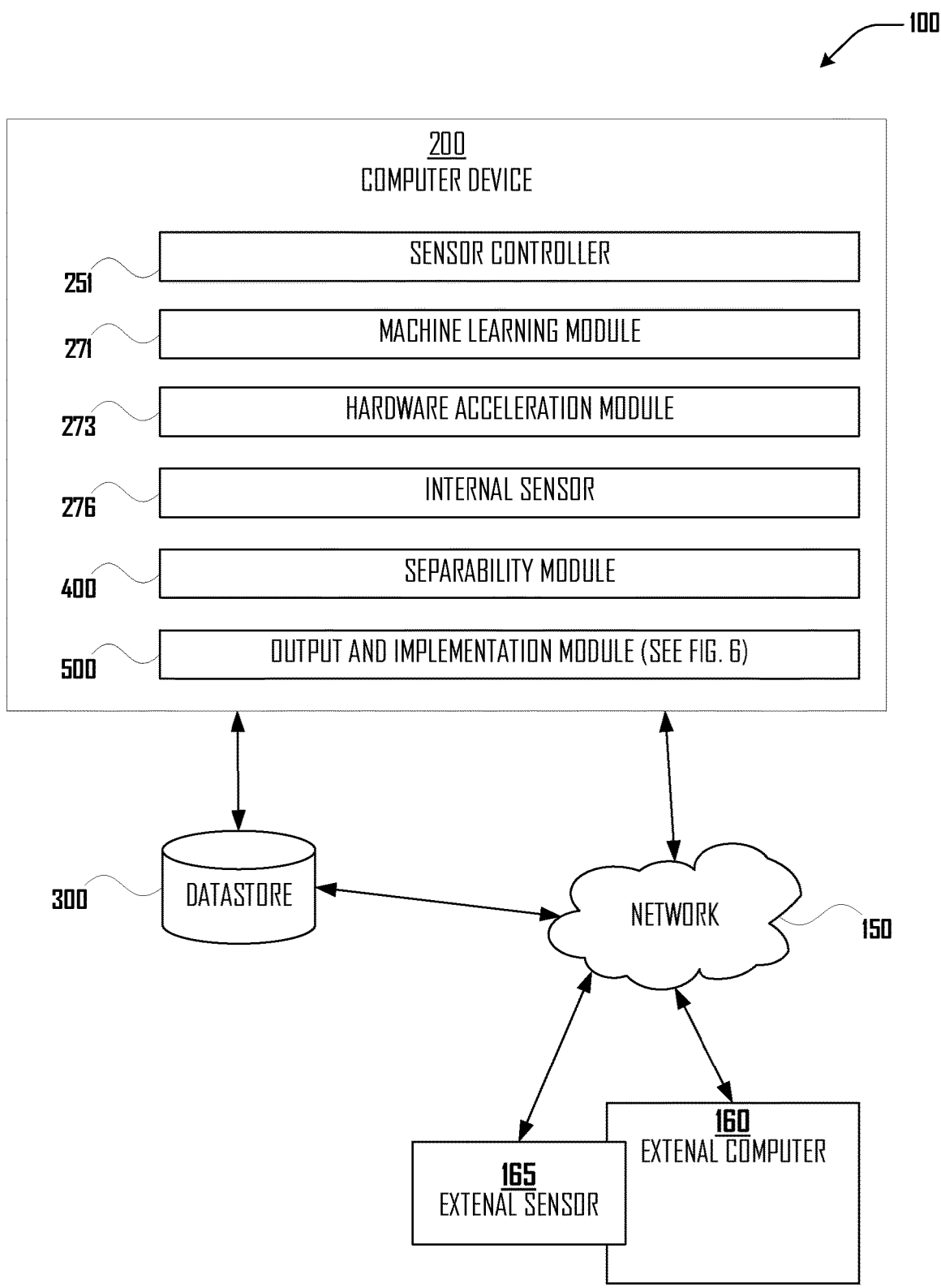
FIG. 1 is a network and device diagram illustrating an example of at least one computer device in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein, a "separable" data class is one which can be reliably distinguished from other data classes in a plurality of data classes.

As used herein, an "artificial neuron" is a mathematical function which receives one or more inputs and sums or otherwise processes them to produce an output. By way of example, each neuron may comprise a feature vector and a label. A new test vector may be compared with each neuron in terms of proximity and may be assigned a label of the neuron to which it is closest. The sums (or results) may be weighted; the sums (or results) may be passed through an activation function or transfer function. The transfer function may have a shape, such as a sigmoid shape, provided by a non-linear function, such as a piecewise linear function, or a step function. The activation function may be monotonically increasing, continuous, differentiable, and bounded. Artificial neurons may be used to determine or aid in determining a similarity (or dissimilarity) value between pairs of values or signals processed by two (or more) artificial neurons.

In overview, this disclosure relates to methods and systems in a computing device apparatus to determine if a data class in a plurality of data classes is separable. Determination regarding whether the data class is separable may involve determining an average intra-class similarity within each data class, determining inter-class similarity across all data classes in the plurality of data classes, and determining separability based on the average intra-class similarity relative to the inter-class similarity. If one or more individual data classes in the plurality of data classes are highly variable, the variable data class(es) may be removed. If a pair of a data classes are not separable from one another, then the pair of data classes may be combined into one class. Output regarding the results of data class analysis may be used to remove highly variable data classes, to combine inseparable data classes, and/or to redesign data collection. The output may be used by a machine learning module which programmatically refines data collection and/or data processing. A device, apparatus, or system practicing or implementing the disclosure, herein, may include a hardware acceleration module, used to accelerate performance of the analysis, and a sensor system which is used to collect the data which is analyzed. The hardware acceleration module may comprise a set of artificial neurons; the set of artificial neurons may reduce the time required to perform data analysis.

Through use of the disclosed method and systems, better decisions can be made with respect to creation of data classes, data collection, and/or data classes can be programmatically eliminated and/or combined with other data classes.

FIG. 1 is a network and device diagram illustrating an example of at least one computer device 200, datastore 300, network 150, external computer 160, and external sensor 165 incorporated with the teachings of the present disclosure, according to some embodiments. In embodiments, computer device 200 may include hardware acceleration module (or hardware accelerator) 273, internal sensor 276, separability module 400, and output and implementation module 500 of the present disclosure (to be described more fully below).

Computer device 200, except for the teachings of the present disclosure, may include, but is not limited to, a server, a workstation computer, a desktop computer, a laptop computer, a gaming computer, a tablet computer (e.g., iPad®, GalaxyTab® and the like), an ultraportable computer, an ultramobile computer, a netbook computer and/or a subnotebook computer, a virtual reality display or supporting computers therefore, a mobile telephone including, but not limited to a smart phone, (e.g., iPhone®, Android®-based phone, Blackberry®, Symbian®-based phone, Palm®-based phone, etc.) and/or a feature phone.

Internal sensor 276 and/or external sensor 165 may be an analog or digital sensor; if analog, a digital-to-analog converter may be used to convert analog data into a digital format. Sensors may include, for example, the following: thermometers, barometers, pressure sensors, cameras, microphones, acceleration, translation, and/or rotation sensors (including speed sensors and inertial measurement units), potentiometers, electromagnetic sensors, magnetometers, and the like.

Also illustrated in FIG. 1 is datastore 300. Datastore 300 is described further, herein, though, generally, it should be understood as a datastore used by computer device 200.

Also illustrated in FIG. 1 is network 150. Network 150 may comprise computers, switches, routers, gateways, network connections among the computers, and software routines to enable communication between the computers over the network connections. Examples of Network 150 comprise wired networks, such as an Ethernet networks, and/or a wireless networks, such as a WiFi, GSM, TDMA, CDMA, EDGE, HSPA, LTE or other network provided by a wireless service provider; local and/or wide area; private and/or public, such as the Internet. More than one network may be involved in a communication session between the illustrated devices. Connection to Network 150 may require that the computers execute software routines which enable, for example, the seven layers of the OSI model of computer networking or equivalent in a wireless phone network.

Also illustrated in FIG. 1 are external computer 160 and external sensor 165. External computer 160 may be a computer similar to computer device 200. External sensor 165 may be part of external computer 160 and/or may be separate therefrom. External computer 160 and external sensor 165 illustrate that data class analysis by computer device 200 may be performed with respect to locally collected data, relative to computer device 200, and/or with respect to externally provided data.

By way of example, computer device 200 may obtain data to be analyzed, such as from internal sensor 276, external sensor 165, or a datastore; data to be analyzed does not need to come from a sensor. Data to be analyzed should be grouped in classes and/or should have or be associated with units (such as meters/second, frequency/second, temperature, pressure, position, distance, etc.). Data to be analyzed according to the disclosure herein should have or be associated with a common set of units (or should be convertible into a common set of units or a dimensionless value or vector).

In general terms, computer device 200 may execute separability module 400 to determine if a data class in a plurality of data classes is separable. Determination regarding whether the data class is separable may involve determining an average intra-class similarity within each data class, determining inter-class similarity across all data classes in the plurality of data classes, and determining separability based on the average intra-class similarity relative to the inter-class similarity. If one or more individual data classes in the plurality of data classes are highly variable, the variable data class(es) may be removed. If a pair of a data classes are not separable from one another, then the pair of data classes may be combined into one class or one of the two classes may be dropped. Output regarding the results of data class analysis may be used to remove one or more data classes with high intra-class variability, to combine inseparable data classes, and/or to redesign data collection. The output may be used by a machine learning module which programmatically refines data collection and/ or data processing. Hardware acceleration may be used during data analysis and during data collection, such as to obtain and process information from sensor(s); hardware acceleration may be provided by a set of artificial neurons; the set of artificial neurons may reduce the time required to perform data analysis. The artificial neurons may be part of an artificial neural network. The set of artificial neurons may be in or part of a microcontroller or small computer. Microcontrollers may comprise, for example, a processor core, memory, and programmable input/output peripherals; programmable memory may also be included, whether on the processor core or in RAM. Microcontrollers are often designed for embedded applications, such as to control products, devices, and sensor(s), such as via actuator(s). An example of such a microcontroller is the Intel® Quark™ SE Microcontroller C1000.

Figure 2:
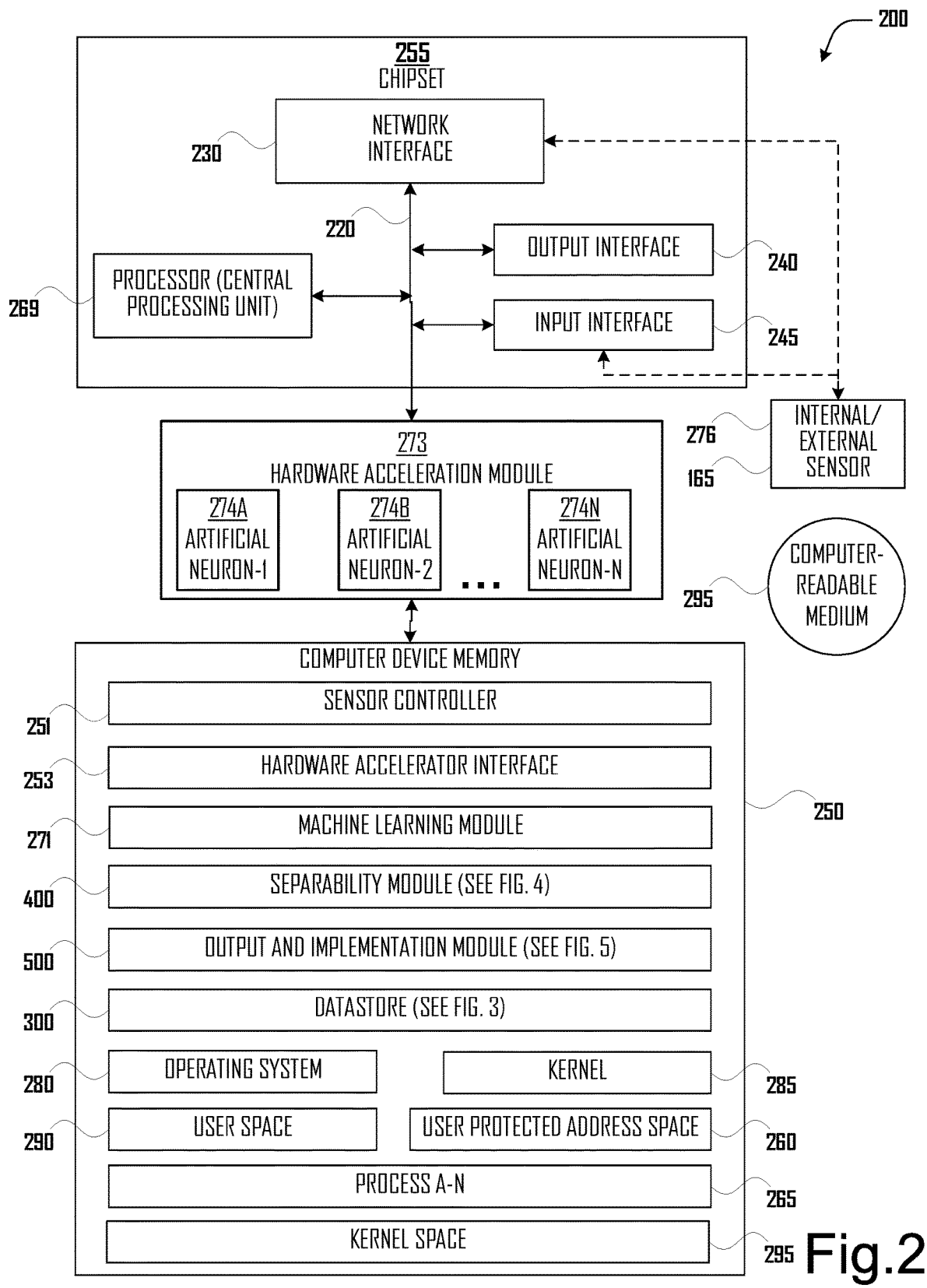
FIG. 2 is a functional block diagram illustrating an example of a computer device incorporated with teachings of the present disclosure, according to some embodiments.

FIG. 2 is a functional block diagram illustrating an example of computer device 200 incorporated with the teachings of the present disclosure, according to some embodiments. Computer device 200 may include chipset 255, comprising processor 269, input/output (I/O) port(s) and peripheral device interfaces, such as output interface 240 and input interface 245, and network interface 230, and computer device memory 250, all interconnected via bus 220. Network Interface 230 may be utilized to couple processor 269 to a network interface card (NIC) to form connections with network 150, with datastore 300, or to form device-to-device connections with other computers. Processor 269 is discussed and illustrated further in relation to FIG. 4.

Chipset 255 may include communication components and/or paths, e.g., buses 220, that couple processor 269 to peripheral devices, such as, for example, output interface 240 and input interface 245, which may be connected via I/O ports. For example, chipset 255 may include a peripheral controller hub (PCH) (not shown). In another example, chipset 255 may include a sensors hub. Input interface 245 and output interface 240 may couple processor 269 to input and/or output devices that include, for example, user and machine interface device(s) including a display, a touchscreen display, printer, keypad, keyboard, etc., storage device(s) including hard disk drives, solid-state drives, removable storage media, etc., and sensor(s) including, for example, internal sensor 276 and/or external sensor 165. I/O ports for input interface 245 and output interface 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Processor 269 may include one or more execution core(s), which may be central processing units ("CPUs") and/or graphics processing units ("GPUs") one or more registers, and one or more cache memor(ies). Processor 269 may include a memory management unit (MMU) to manage memory accesses between processor 269 and computer device memory 250. In some embodiments, processor 269 may be configured as one or more socket(s); each socket may include one or more core(s), a plurality of registers and one or more cache memor(ies). Each core may be configured to execute one or more process(es) 265 and/or one or more thread(s). A plurality of registers may include a plurality of general purpose registers, a status register and an instruction pointer. Cache(s) may include one or more cache memories, which may be used to cache separability module 400, output and implementation module 500 of the present disclosure.

Computer device 200 may comprise hardware acceleration module 273. Hardware acceleration module 273 may be provided by, for example, a microcontroller or a programmable circuit, such as Field Programmable Gate Array ("FPGA"). Hardware acceleration module 273 may comprise one or more artificial neurons, such as artificial neuron-1 274A to artificial neuron-N 274N. The artificial neurons may be arrayed in an artificial neural network. Illustrated as part of computer device memory 250 is machine learning module 271. Machine learning module 271 may be part of and/or may be provided by hardware acceleration module 273, for example, in the case of artificial neurons, in an artificial neural network, used for machine learning. Machine learning module 271 represents any system for pattern recognition, particularly those in which a data model or schema may not be explicitly provided in advance by a programmer, but may be determined through data sampling. Machine learning is often used for prediction and/or in the context of large data sets which are difficult for humans to analyze. In alternate embodiments, hardware acceleration module 273 may be directly coupled with processor 269 via a dedicated interface between the two components.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for software modules or routines, such as, for example, sensor controller 251 (which may be used to control internal sensor 276 and/or external sensor 165; sensor controller 251 may also or alternatively be provided by hardware acceleration module 273, machine learning module 271, separability module 400 (illustrated and discussed further in relation to FIG. 4), and output and implementation module 500 (illustrated and discussed further in relation to FIG. 5).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
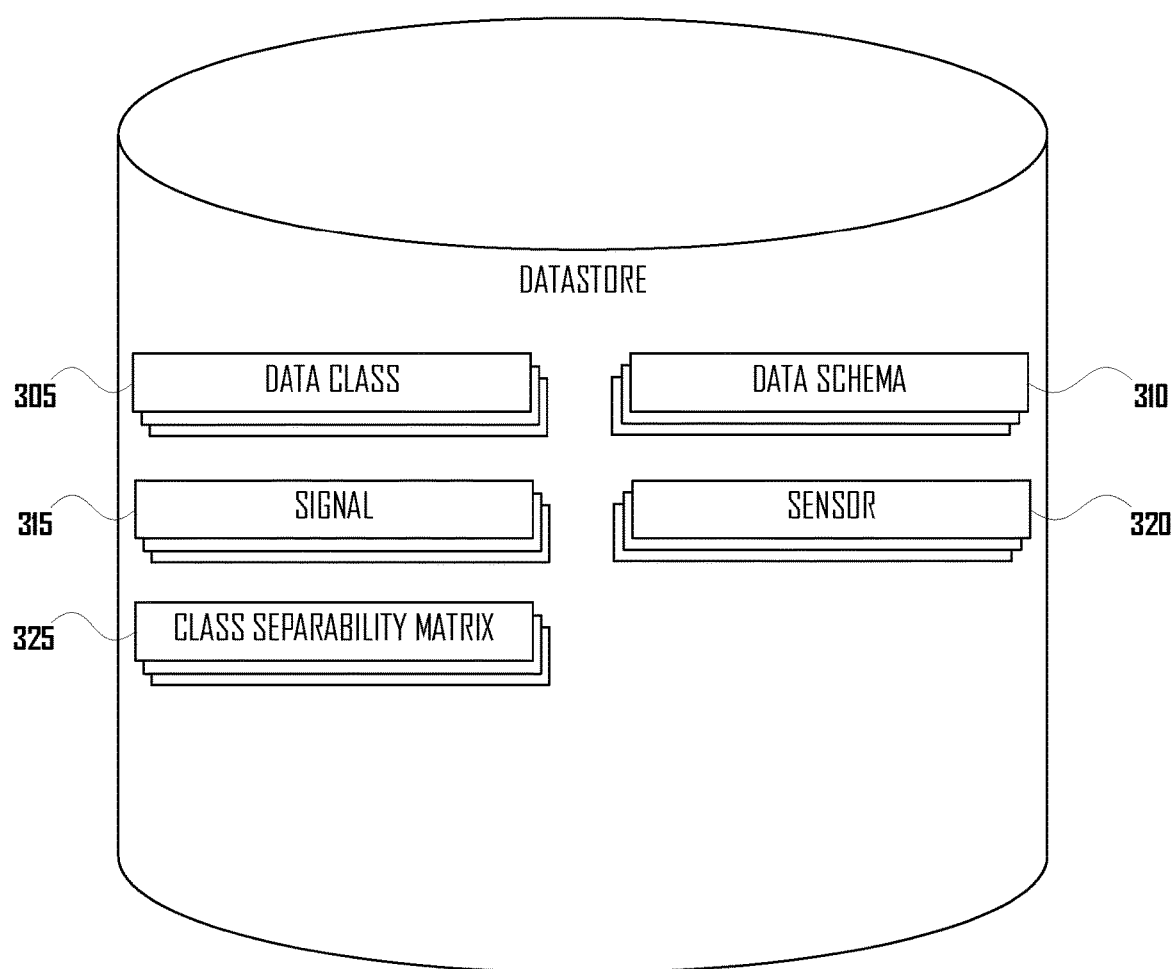
FIG. 3 is a functional block diagram illustrating an example of a datastore for practicing the present disclosure, consistent with embodiments of the present disclosure.

Computer device memory 250 is also illustrated as comprising operating system 280, kernel 285, kernel space 295, user space 290, user protected address space 260, and datastore 300 (illustrated and discussed further in relation to FIG. 3). Operating system 280 and/or kernel 285 may be stored in kernel space 295. In some embodiments, operating system 280 may include kernel 285.

Computer device memory 250 may store one or more process 265 (i.e., executing software application(s)). Process 265 may be stored in user space 290. Process 265 may include one or more other process 265A . . . 265N. One or more process 265 may execute generally in parallel, i.e., as a plurality of processes and/or a plurality of threads. Operating system 280 and/or kernel 285 may attempt to protect kernel space 295 and prevent access by one or more process 265A . . . 265N.

Kernel 285 may be configured to provide an interface between user processes and circuitry associated with computer device 200. In other words, kernel 285 may be configured to manage access to processor 269, chipset 255, I/O ports and peripheral devices by process 265. Kernel 285 may include one or more drivers configured to manage and/or communicate with elements of computer device 200 (i.e., processor 269, chipset 255, I/O ports and peripheral devices).

Computer device 200 may also comprise or communicate via bus 220 and/or network interface 230 with datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. Computer device 200 may, in some embodiments, include many more components than as illustrated. However, it is not necessary that all components be shown in order to disclose an illustrative embodiment.

FIG. 3 is a functional block diagram of datastore 300 illustrated in the computer device of FIG. 2, according to some embodiments. Datastore 300 may comprise multiple datastores, in and/or remote with respect to computer device 200. Datastore 300 may be distributed. The components of datastore 300 may include data groups used by modules and/or routines, e.g, data class 305, data class 310, signal 315, sensor 320, class separability matrix 325, and schema user 330 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of datastore 300 are discussed further herein in the discussion of other of the Figures. In overview, data class 305 records may record classes of values or signals in a data schema. Certain of the data classes may be comparable. Comparable data classes are data classes associated with the same units, units which are convertible into one another, or dimensionless values or vectors. For example, a data classes may comprise measurements from sensors type; when the data classes use or are associated with the same units or dimensionless values or vectors, they may be comparable. Data schema 310 records may record a structure of one or more data classes. Signal 315 records may record information from, for example, one or more sensors or other sources in form of data. Sensor 320 records may record information regarding sensors; sensor records may be used to access and control sensors via a controller, such as sensor controller 251. Class separability matrix 325 records may record a class separability matrix as described herein. Schema user 330 records may comprise registered users of database schema, for example, a machine learning problem, a module, or other process utilizing or accessing a schema. Registered users may receive or access an updated schema.

Figure 4:
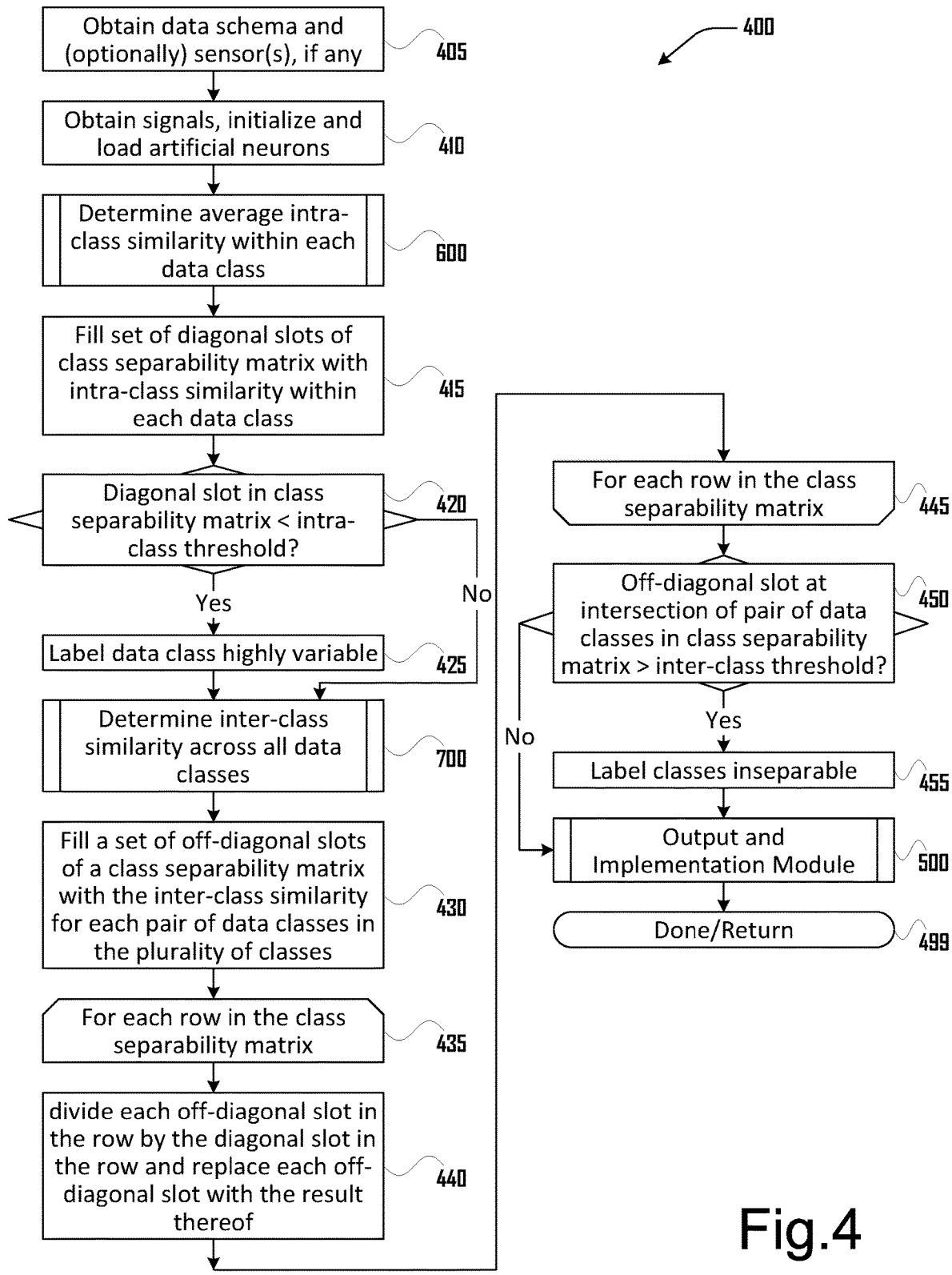
FIG. 4 is a flow diagram illustrating an example of a method performed by a separability module, according to some embodiments.

FIG. 4 is a flow diagram illustrating an example of a method for a separability module 400, according to some embodiments. Performance of separability module 400 may be by, for example, separability module of computer device 200.

At block 405, separability module 400 may obtain a data schema to be analyzed. The data schema may comprise more than one data class. Certain of the data classes may be comparable. Comparable data classes are data classes associated with the same units, units which are convertible into one another, or which are dimensionless. For example, a comparable data classes may comprise measurements from a common sensor type, such as from an inertial measurement unit, from a microphone, from a camera, and the like. Different data classes may be intended to distinguish different measured events, such as signed symbols, though, as discussed herein, the different measured events produce measured data, described herein as "signals", which may be insufficiently distinguishable from one another to distinguish the different events and/or may produce signals which are too variable, within an event. Data schema may be stored, defined, and/or identified in one or more data schema 310 records in datastore 300. Data classes in data schema may be stored, defined, and/or identified in one or more data class 305 records in datastore 300. Separability module 400 may also obtain identification of sensors used to provide signals in the data classes of the data schema. Identification of sensors may allow connection to such sensors via, for example, sensor controller 251. Identified sensors may be stored as, for example, one or more sensor 320 records in datastore 300. Signals from sensors may be stored as, for example, one or more signal 315 records.

At block 410, separability module 400 may obtain signals, such as from a sensor or a datastore source, such as from signal 315 records. Throughout FIG. 4, separability module 400 may initialize hardware accelerator, such as hardware acceleration module 273, to receive signals 315 and to process the signals 315. For example, separability module 400 may initialize a set of artificial neurons to receive signals 315 and/or a result of a processing of signals 315. The signals may be associated with one or more data class 305. Configuring the artificial neurons may comprise configuring the processing to be applied by the artificial neurons to their input, such as summing, weighting of input or output, and configuring an activation or transfer function of the artificial neurons.

For example, a set of signal may be represented as a table, such as in FIG. 8 (the set of signals may also be a flat file). In the table in FIG. 8 table, each row is a signal vector and a label. In this example, each signal vector comprises eight signals (the first eight columns) and a label (the ninth column). The signals are recorded measurements from accelerometer and gyroscopes strapped to the bottom of the back of test subjects. In this example, the labels may range from 0 to 4, where 0 is a measurement from walking, 1 is from running, 2 is from crawling, 3 is climbing, and 4 is pronating. This is not a complete data set (which can go on for thousands of rows), but is a sample.

By way of example, FIGS. 9A, 9B, 9C, and 9D comprise pseudocode which may be used, together, by separability module 400 to process the signals of FIG. 8.

Figure 6:
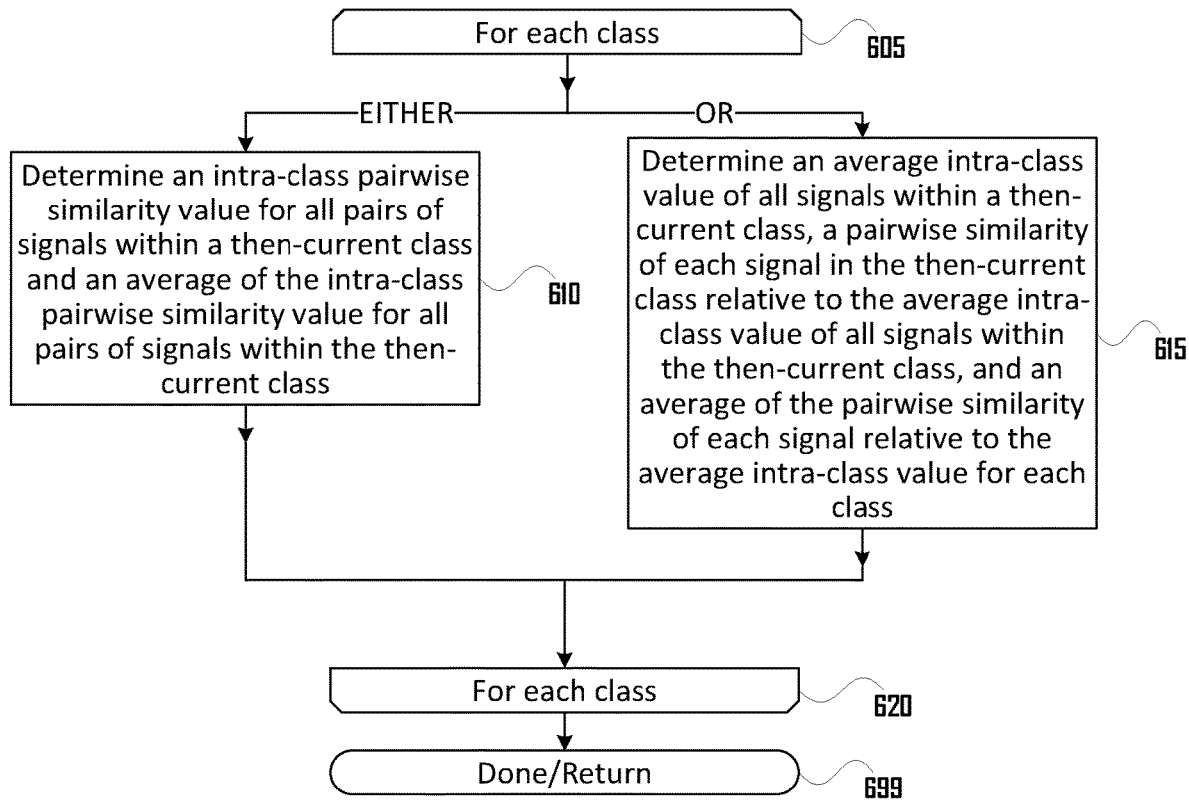
FIG. 6 is a flow diagram illustrating an example of a method to determine average intra-class similarity.

At block 600, separability module 400 may determine average intra-class similarity within each data class, an example of which determination is described further in relation to FIG. 6.

At block 415, separability module 400 may fill a set of diagonal slots of a class separability matrix with the average intra-class similarity determined at block 600. The class separability matrix may comprise a matrix listing the data classes down the first column and along the top row, as in Table 1 (below). Class separability matrix or an equivalent datastructure may be stored in datastore 300 as one or more class separability matrix 325 records.

TABLE 1

|  | walking | running | crawling | climbing | pronating |
|---|---|---|---|---|---|
| walking | 0.9723 | | | | |
| running | 0 | 0.9413 | | | |
| crawling | 0 | 0 | 0.9201 | | |
| climbing | 0 | 0 | 0 | 0.8592 | |
| pronating | 0 | 0 | 0 | 0 | 0.9647 |

At decision block 420, separability module 400 may determine whether any of the diagonal slots of block 415 are less than an intra-class threshold. For example, if average intra-class similarity is low, below the intra-class threshold, this may indicate that signals in the data class are highly variable, which may be undesirable for a data class. The intra-class threshold may be, for example, 0.5. The threshold may be higher or lower, depending on the context and expected or allowable intra-class variability.

If affirmative or equivalent at decision block 420, at block 425 separability module 400 may label one or more data classes which fell below the intra-class threshold as highly variable.

Block 700 may follow block 425 or may follow decision block 420, if negative or equivalent. At block 700, separability module 400 may determine inter-class similarity across all data classes, an example of which determination is described further in relation to FIG. 7. This determination may be done for each pair of data classes in the schema.

At block 430, separability module 400 may fill a set of off-diagonal slots of the class separability matrix with an inter-class similarity for each pair of data classes, for example, as may have been determined at block 700. By way of example, Table 1, above, is completed in Table 2, below, pursuant to this block.

TABLE 2

|  | walking | running | crawling | climbing | pronating |
|---|---|---|---|---|---|
| walking | 0.9723 | 0.4773 | 0.42 | 0.9178 | 0.6425 |
| running | 0 | 0.9413 | −0.026 | 0.3091 | −0.0491 |
| crawling | 0 | 0 | 0.9201 | 0.4755 | 0.9618 |
| climbing | 0 | 0 | 0 | 0.8592 | 0.7564 |
| pronating | 0 | 0 | 0 | 0 | 0.9647 |

Opening loop block 435 to closing loop block 445 may iterate for each row in the class separability matrix.

At block 440, separability module 400 may divide each off-diagonal slot (from block 430) in the then-current row by the diagonal slot in the row and replace each off-diagonal slot in the row with the result thereof. By way of example, Table 2, above, is completed in Table 3, below, pursuant to this block.

TABLE 3

|  | walking | running | crawling | climbing | pronating |
|---|---|---|---|---|---|
| walking | 0.9723 | 0.4909 | 0.432 | 0.9439 | 0.6608 |
| running | 0 | 0.9413 | −0.0276 | 0.3284 | −0.0522 |
| crawling | 0 | 0 | 0.9201 | 0.5168 | 1.0453 |
| climbing | 0 | 0 | 0 | 0.8592 | 0.8804 |
| pronating | 0 | 0 | 0 | 0 | 0.9647 |

At decision block 450, separability module 400 may determine if any off-diagonal slots at the intersection of pairs of data classes in the class separability matrix are above an inter-class threshold. If a pair of data classes is above an inter-class threshold, this may indicate that the pair of data classes are not separable or, equivalently, that they are inseparable; e.g. that the pair of data classes should not be considered distinct from one another. For example, the inter-class threshold may be, for example, 0.8. The threshold may be higher or lower, depending on the context and the need for or expected inter-class correlation. For example, 0.8 may be regarded as low in the context of physical laws and data collected by high-quality instruments; in the context of social sciences, 0.8 may be regarded as high when there is a contribution by many complicating factors.

If affirmative or equivalent at decision block 450, at block 455 separability module 400 may label pair(s) of data classes which were above the inter-class threshold being inseparable.

Block 500 may follow block 455 or may follow decision block 450, if negative or equivalent. At block 500, separability module 400 may call output and implementation module 500 to output and implement results of separability module 400.

At done block 499, separability module 400 may conclude and/or return to a process which called it.

Figure 5:
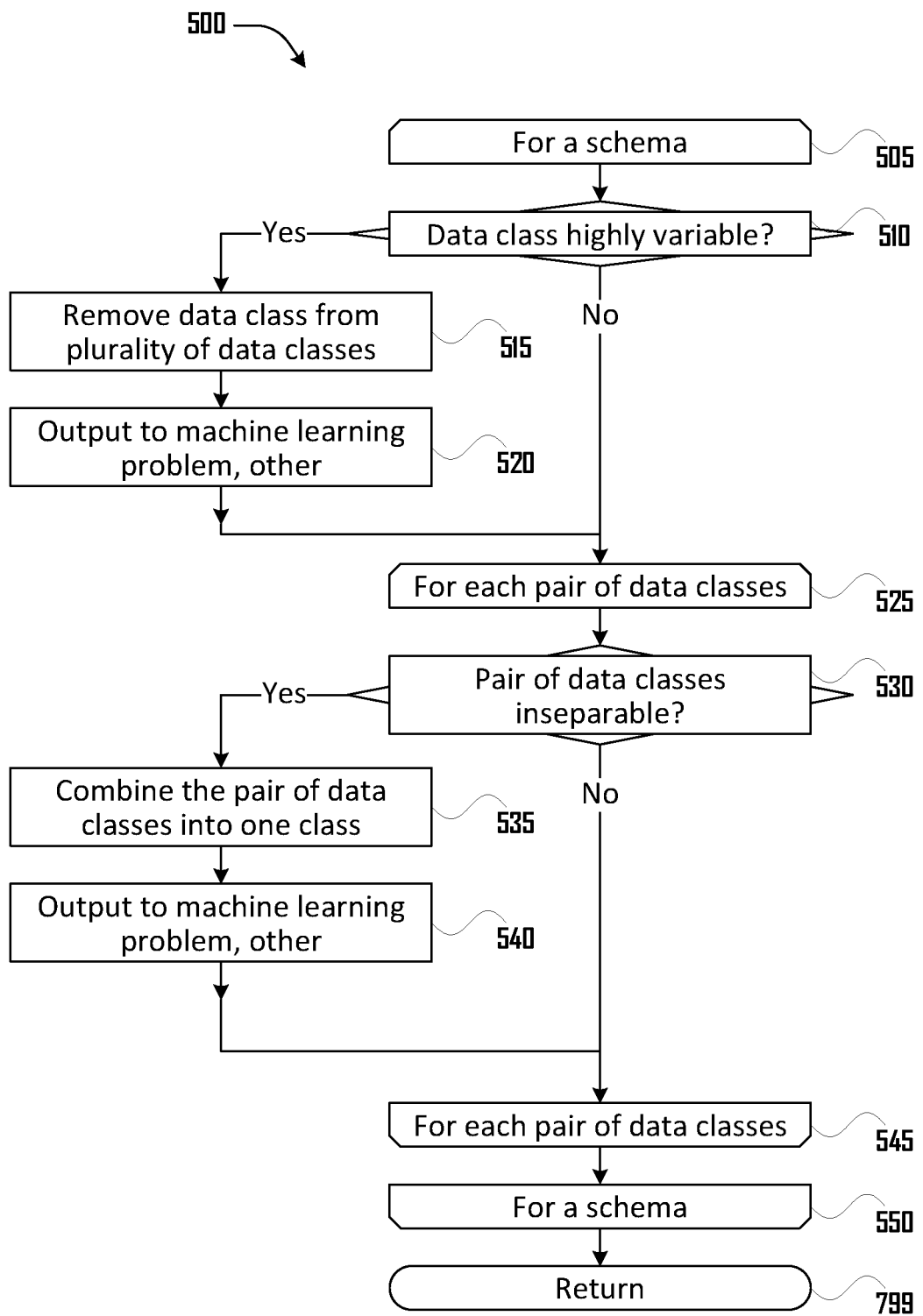
FIG. 5 is a flow diagram illustrating an example of a method performed by an output and implementation module, according to some embodiments.

FIG. 5 is a flow diagram illustrating an example of a method performed by an output and implementation module 500, according to some embodiments. Performance of output and implementation module 500 may be by, for example computer device 200. Output and implementation module 500 may be performed in response to a call by a process or another module, such as separability module 400.

Opening loop block 505 to closing loop block 550 may iterate over data schema(s) processed by, for example, separability module 400.

At decision block 505, output and implementation module 500 may determine whether a data class in the then-current schema has been determined to be highly variable, such as by, for example, separability module 400. If affirmative or equivalent, at block 515, output and implementation module 500 may remove such data class from the schema. At block 520, output and implementation module 500 may output the updated schema to, for example, a machine learning problem, module, process or other process utilizing the schema. For example modules, processes and the like may have registered to use the schema. Such registered users may be recorded in datastore 300 in, for example, one or more schema user 330 records. Such registered users may either receive an update to the schema by output and implementation module 500 or, on a next access to the schema, may access the schema as modified by output and implementation module 500.

Opening loop block 525 to closing loop block 545 may iterate for each pair of data classes in the then-current schema. At decision block 530, output and implementation module 500 may determine whether a pair of data classes has been determined to be inseparable, such as by, for example, separability module 400. If affirmative or equivalent at decision block 530, output and implementation module 500 may, at block 535, combine the pair of data classes into one class. This combination may, for example, result in processing of data from or associated with the pair of data classes as one class. Alternatively, one of the two data classes may be dropped.

At block 540, output and implementation module 500 may output the updated schema to, for example, a machine learning problem, module, process or other process utilizing the schema. Such update may be made to or may be accessible to one or more users of the schema, such as, for example, according to one or more schema user 330 records. Such registered users may either receive an update to the schema by output and implementation module 500 or, on a next access to the schema, may access the schema as modified by output and implementation module 500.

At closing loop block 545, output and implementation module 500 may return to opening loop block 525 to iterate over the next pair of data classes, if any. At closing loop block 550, output and implementation module 500 may return to opening loop block 505 to iterate over the next schema, if any.

At done block 599, output and implementation module 500 may conclude and/or return to another module, process, routine or the like which may have called it.

FIG. 6 is a flow diagram illustrating an example of a method to determine average intra-class similarity. This method may be performed or called by, for example, separability module 400.

Opening loop block 605 to closing loop block 620 may iterate over each data class in a schema.

Either block 610 or 615 may be followed. At block 610, the method to determine average intra-class similarity may determine an intra-class pairwise similarity value for all pairs of signals within a then-current class and an average of the intra-class pairwise similarity value for all pairs of signals within the then-current class. In performing this determination, the method may load pairs of signals into a hardware accelerator, such as hardware acceleration module 273. Pairs of signals may be loaded into, for example, artificial neurons 274A-N. Artificial neurons may be used to determine or aid in determining a similarity (or dissimilarity) value. A similarity (or dissimilarity) value may be determined according to, for example, a correlation or a distance measure, such as, for example, a Pearson product-moment correlation coefficient, a Manhattan distance metric, a Euclidean distance metric, a Hamming distance metric, and the like.

At block 615, the method to determine average intra-class similarity may determine an average intra-class value of all signals within a then-current class, an pairwise similarity of each signal in the then-current class relative to the average intra-class value of all signals within the then-current class, and an average of the pairwise similarity of each signal relative to the average intra-class value for each class. As in block 610, the method to determine average intra-class similarity may load pairs of signals into a hardware accelerator, such as hardware acceleration module 273. Pairs of signals may be loaded into, for example, artificial neurons 274A-N. A similarity (or dissimilarity) value may be determined according to, for example, a correlation or a distance measure, such as, for example, a Pearson product-moment correlation coefficient, a Manhattan distance metric, a Euclidean distance metric, a Hamming distance metric, and the like.

At closing loop block 620, the method to determine average intra-class similarity may return to opening loop block 605 to iterate over another class in the schema, if any.

At done block 699, the method to determine average intra-class similarity may conclude and/or return to another module, process, routine or the like which may have called it, such as separability module 400.

Figure 7:
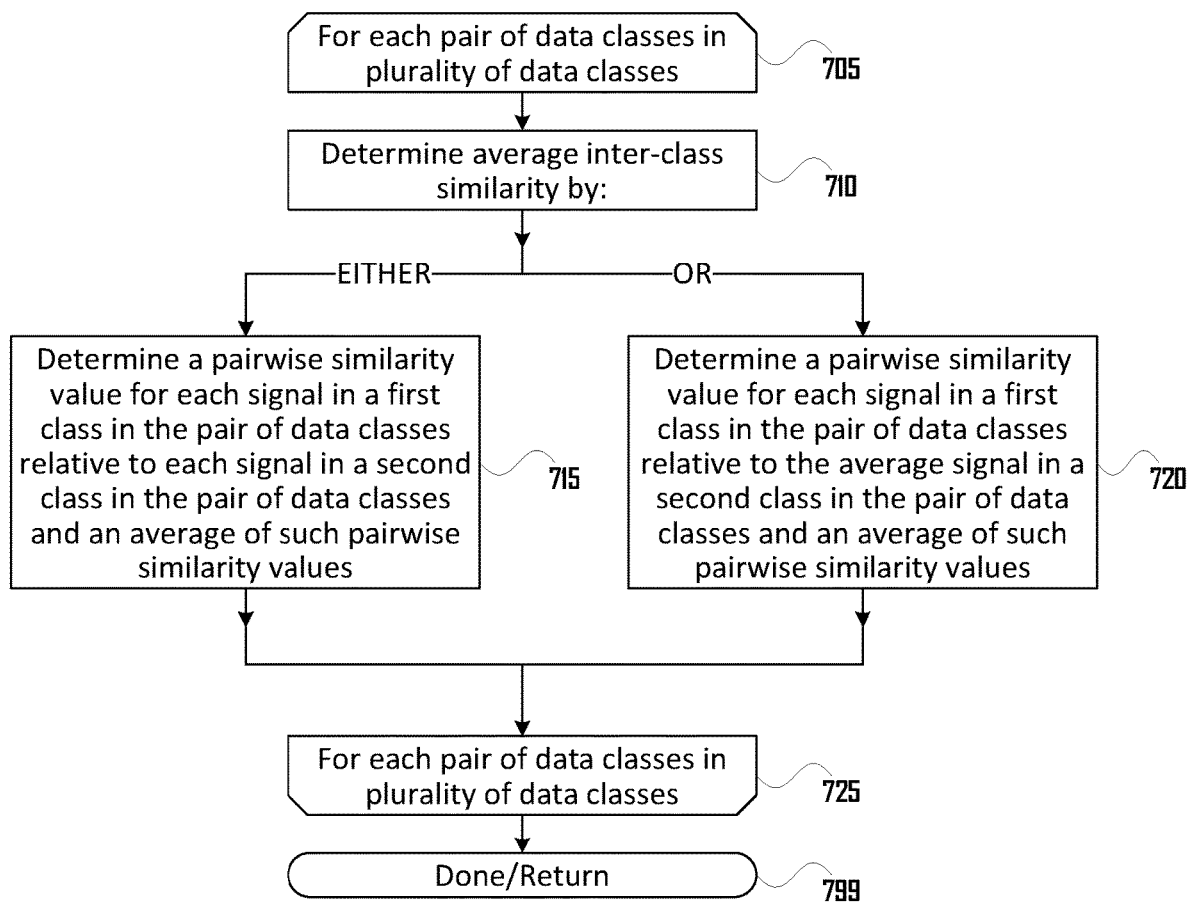
FIG. 7 is a flow diagram illustrating an example of a method to determine inter-class similarity.

FIG. 7 is a flow diagram illustrating an example of a method to determine inter-class similarity. This method may be performed or called by, for example, separability module 400.

Opening loop block 705 to closing loop block 725 may iterate over each pair of data classes in a plurality of data classes in a schema.

At block 710, average inter-class similarity may be determined by either block 715 or 720.

At block 715, the method to determine inter-class similarity may determine a pairwise similarity value for each signal in a first class in the pair of data classes relative to each signal in a second class in the pair of data classes and an average of such pairwise similarity values. As in the method to determine average intra-class similarity, the method to determine inter-class similarity may load pairs of signals or values into a hardware accelerator, such as hardware acceleration module 273. Pairs of signals may be loaded into, for example, artificial neurons 274A-N. Artificial neurons may be used to determine or aid in determining a similarity (or dissimilarity value) or correlation coefficient. A similarity (or dissimilarity) value may be determined according to, for example, a correlation or a distance measure, such as, for example, a Pearson product-moment correlation coefficient, a Manhattan distance metric, a Euclidean distance metric, a Hamming distance metric, and the like.

At block 720, the method to determine inter-class similarity may determine a pairwise similarity value for each signal in a first class in the pair of data classes relative to the average signal in a second class in the pair of data classes and an average of such pairwise similarity values. As in block 715, the method to determine inter-class similarity may load pairs of signals or values into a hardware accelerator, such as hardware acceleration module 273. Pairs of signals may be loaded into, for example, artificial neurons 274A-N. A similarity (or dissimilarity) value may be determined according to, for example, a correlation or a distance measure, such as, for example, a Pearson product-moment correlation coefficient, a Manhattan distance metric, a Euclidean distance metric, a Hamming distance metric, and the like.

At closing loop block 725, the method to determine inter-class similarity may return to opening loop block 705 to iterate over another pair of data classes in the plurality of data classes in the schema, if any.

At done block 799, the method to determine average inter-class similarity may conclude and/or return to another module, process, routine or the like which may have called it, such as separability module 400.

FIG. 8 is an example of a set of signals to be processed according to embodiments of the disclosure herein.

FIGS. 9A, 9B, 9C, and 9D comprise pseudocode which may be used, together, by separability module 400 to process the signals of FIG. 8.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1. An apparatus for computing, comprising: a computer processor having at least one central processing unit ("CPU") and a hardware accelerator; and a separability module to be operated by the computer processor to determine if a data class in a plurality of data classes is separable, wherein to determine if the data class is separable, the separability module is to determine an average intra-class similarity within each class, an inter-class similarity across all data classes, and is to determine separability of the data class based on the average intra-class similarity relative to the inter-class similarity, wherein the hardware accelerator is encoded with a logic to perform a comparison, wherein the logic is used by the separability module to determine if the data class in a plurality of data classes is separable; an output and implementation module to be operated by the computer processor, to output a result of the separability of the data class to a data collector, wherein the data collector is to adapt data collection based at least in part on the result of the separability of the data class.

Example 2. The apparatus according to Example 1, wherein to determine the average intra-class similarity within each class, the separability module is to determine, for each class, either i) an intra-class similarity value for all pairs of signals within a then-current class and an average of the intra-class similarity value for all pairs of signals within the then-current class, or ii) an average intra-class value of all signals within a then-current class, a similarity of each signal in the then-current class relative to the average intra-class value of all signals within the then-current class, and an average of the similarity of each signal relative to the average intra-class value for each class.

Example 3. The apparatus according to Example 1 or Example 2, wherein the separability module is to fill a set of diagonal slots of a class separability matrix with the average intra-class similarity within each class.

Example 4. The apparatus according to Example 1, wherein to determine the inter-class similarity across all data classes, the separability module is to determine, for a pair of data classes in the plurality of data classes, an average inter-class similarity.

Example 5. The apparatus according to Example 4, wherein the average inter-class similarity is determined either according to i) a similarity value for each signal in a first class in the pair of data classes relative to each signal in a second class in the pair of data classes and an average of such similarity values, or ii) a similarity value for each signal in a first class in the pair of data classes relative to the average signal in a second class in the pair of data classes and an average of such similarity values.

Example 6. The apparatus according to Example 4 or Example 5, wherein the separability module is to fill a set of off-diagonal slots of a class separability matrix with the inter-class similarity for each pair of data classes in the plurality of classes.

Example 7. The apparatus according to Example 3 and Example 6, wherein the separability module is to, for each row in the class separability matrix, divide each off-diagonal slot in the row by the diagonal slot in the row and replace each off-diagonal slot with the result thereof.

Example 8. The apparatus according to Example 7, wherein the separability module is to determine a pair of data classes to be inseparable from one another when an off-diagonal slot at the intersection of the pair of data classes in the class separability matrix has a value greater than an inter-class threshold.

Example 9. The apparatus according to Example 8, wherein the inter-class threshold is within a range of 0.7 to 0.9.

Example 10. The apparatus according to Example 1, wherein the output and implementation module is to output the result that the pair of data classes are inseparable and is to either combine the pair of data classes into one class in the plurality of data classes for a machine learning problem or drop one of the pair of data classes for the machine learning problem.

Example 11. The apparatus according to Example 3, wherein the separability module is determine the data class to be highly variable when a diagonal slot of the data class in the set of diagonal slots has a value less than an intra-class threshold.

Example 12. The apparatus according to Example 11, wherein the intra-class threshold is 0.5.

Example 13. The apparatus according to Example 11, wherein the output and implementation module is to output the result that the data class is highly variable and is to remove the data class from the plurality of data classes for a machine learning problem.

Example 14. The apparatus according to Example 1, wherein the computer processor further comprises an internal sensor subsystem.

Example 15. The apparatus according to Example 14, wherein the internal sensor subsystem is to receive an identification of the plurality of data classes and collect a set of signal data comprising the plurality of data classes, wherein the set of signal data have a common set of units.

Example 16. The apparatus according to Example 14, wherein the internal sensor subsystem is controlled at least in part by the hardware accelerator.

Example 17. The apparatus according to Example 1, wherein the logic to perform the comparison is executed at least in part by a set of artificial neurons of the hardware accelerator.

Example 18. The apparatus according to Example 17, wherein pairs of signals are loaded in the artificial neurons at least in part to determine if the data class in the plurality of data classes is separable.

Example 19. The apparatus according to any one of Example 1 to Example 18, wherein similarity is determined according to at least one of a correlation coefficient or distance measurement.

Example 20. A computer implemented method, comprising: with a hardware accelerator encoded with a logic to perform a comparison, determining if a data class in a plurality of data classes is separable, wherein determining if the data class is separable comprises determining an average intra-class similarity within each data class in the plurality of data classes, an inter-class similarity across all data classes, and determining separability of the data class based on the average intra-class similarity relative to the inter-class similarity; adapting a data collection based at least in part on a result of determining if the data class in the plurality of data classes is separable.

Example 21. The method according to Example 20, wherein determining the average intra-class similarity within each data class comprises determining, for each data class, either i) an intra-class similarity value for all pairs of signals within a then-current class and an average of the intra-class similarity value for all pairs of signals within the then-current class, or ii) an average intra-class value of all signals within a then-current class, a similarity of each signal in the then-current class relative to the average intra-class value of all signals within the then-current class, and an average of the similarity of each signal relative to the average intra-class value for each class.

Example 22. The method according to Example 20 or Example 21, further comprising filling a set of diagonal slots of a class separability matrix with the average intra-class similarity within each data class.

Example 23. The method according to Example 20, wherein determining the inter-class similarity across all data classes comprises determining, for a pair of data classes in the plurality of data classes, an average inter-class similarity.

Example 24. The method according to Example 23, wherein determining the average inter-class similarity comprises either i) determining a similarity value for each signal in a first class in the pair of data classes relative to each signal in a second class in the pair of data classes and an average of such similarity values, or ii) determining a similarity value for each signal in a first class in the pair of data classes relative to the average signal in a second class in the pair of data classes and an average of such similarity values.

Example 25. The method according to Example 23 or Example 24, further comprising filling a set of off-diagonal slots of a class separability matrix with the inter-class similarity for each pair of data classes in the plurality of classes.

Example 26. The method according to Example 22 and Example 25, further comprising, for each row in the class separability matrix, dividing each off-diagonal slot in the row by the diagonal slot in the row and replacing each off-diagonal slot with the result thereof.

Example 27. The method according to Example 26, further comprising determining a pair of data classes to be inseparable from one another when an off-diagonal slot at the intersection of the pair of data classes in the class separability matrix has a value greater than an inter-class threshold.

Example 28. The method according to Example 27, wherein the inter-class threshold is within a range of 0.7 to 0.9.

Example 29. The method according to Example 20, wherein the result of determining if the data class in the plurality of data classes is separable is that the pair of data classes are inseparable and either combining the pair of data classes into one class in the plurality of data classes for a machine learning problem or dropping one of the pair of data classes for the machine learning problem.

Example 30. The method according to Example 22, further comprising determining the data class to be highly variable when a diagonal slot of the data class in the set of diagonal slots has a value less than an intra-class threshold.

Example 31. The method according to Example 30, wherein the intra-class threshold is 0.5.

Example 32. The method according to Example 30, further comprising determining the result that the data class is highly variable and removing the data class from the plurality of data classes for a machine learning problem.

Example 33. The method according to Example 20, further comprising receiving an identification of the plurality of data classes and collecting with an internal sensor subsystem a set of signal data comprising the plurality of data classes, wherein the set of signal data have a common set of units.

Example 34. The method according to Example 33, further comprising controlling the internal sensor subsystem is with the hardware accelerator.

Example 35. The method according to Example 20, wherein the hardware accelerator comprise a set of artificial neurons and further comprising loading pairs of signals in the artificial neurons and using the artificial neurons at least in part to determine if the data class in the plurality of data classes is separable.

Example 36. The method according to any one of Example 20 to Example 35, wherein similarity is determined according to at least one of a correlation coefficient or a distance metric.

Example 37. An apparatus for computing, comprising: means to, with a hardware accelerator encoded with a logic to perform a comparison, determine if a data class in a plurality of data classes is separable, wherein means to determine if the data class is separable comprises means to determine an average intra-class similarity within each data class in the plurality of data classes, means to determine an inter-class similarity across all data classes, and means to determine separability of the data class based on the average intra-class similarity relative to the inter-class similarity; means to adapt a data collection based at least in part on a result obtained from the means to determine if the data class in the plurality of data classes is separable.

Example 38. The apparatus according to Example 37, wherein means to determine the average intra-class similarity within each data class comprises means to determine, for each data class, either i) an intra-class similarity value for all pairs of signals within a then-current class and an average of the intra-class similarity value for all pairs of signals within the then-current class, or ii) an average intra-class value of all signals within a then-current class, a similarity of each signal in the then-current class relative to the average intra-class value of all signals within the then-current class, and an average of the similarity of each signal relative to the average intra-class value for each class.

Example 39. The apparatus according to Example 37 or Example 38, further comprising means to fill a set of diagonal slots of a class separability matrix with the average intra-class similarity within each data class.

Example 40. The apparatus according to Example 37, wherein means to determine the inter-class similarity across all data classes comprises means to determine, for a pair of data classes in the plurality of data classes, an average inter-class similarity.

Example 41. The apparatus according to Example 40, wherein means to determine the average inter-class similarity comprises either i) means to determine a similarity value for each signal in a first class in the pair of data classes relative to each signal in a second class in the pair of data classes and an average of such similarity values, or ii) means to determine a similarity value for each signal in a first class in the pair of data classes relative to the average signal in a second class in the pair of data classes and an average of such similarity values.

Example 42. The apparatus according to Example 40 or Example 41, further comprising means to fill a set of off-diagonal slots of a class separability matrix with the inter-class similarity for each pair of data classes in the plurality of classes.

Example 43. The apparatus according to Example 39 and Example 42, further comprising means to, for each row in the class separability matrix, divide each off-diagonal slot in the row by the diagonal slot in the row and replace each off-diagonal slot with the result thereof.

Example 44. The apparatus according to Example 43, further comprising means to determine a pair of data classes to be inseparable from one another when an off-diagonal slot at the intersection of the pair of data classes in the class separability matrix has a value greater than an inter-class threshold.

Example 45. The apparatus according to Example 44, wherein the inter-class threshold is within a range of 0.7 to 0.9.

Example 46. The apparatus according to Example 37, wherein the means to determine separability of the data class based on the average intra-class similarity relative to the inter-class similarity determines that the pair of data classes are inseparable and further comprising means to either combine the pair of data classes into one class in the plurality of data classes for a machine learning problem or drop one of the pair of data classes for the machine learning problem.

Example 47. The apparatus according to Example 39, further comprising means to determine the data class to be highly variable when a diagonal slot of the data class in the set of diagonal slots has a value less than an intra-class threshold.

Example 48. The apparatus according to Example 47, wherein the intra-class threshold is 0.5.

Example 49. The apparatus according to Example 47, further comprising means to determine the result that the data class is highly variable and means to remove the data class from the plurality of data classes for a machine learning problem.

Example 50. The apparatus according to Example 37, wherein the apparatus further comprises an internal sensor subsystem.

Example 51. The apparatus according to Example 50, wherein the internal sensor subsystem is controlled at least in part by the hardware accelerator Example 52. The apparatus according to Example 50, further comprising means to receive an identification of the plurality of data classes and means to collect with the internal sensor subsystem a set of signal data comprising the plurality of data classes, wherein the set of signal data have a common set of units.

Example 53. The apparatus according to Example 37, wherein the hardware accelerator comprises a set of artificial neurons and further comprising means to load pairs of signals in the artificial neurons to determine at least in part if the data class in the plurality of data classes is separable.

Example 54. The apparatus according to any one of Example 37 to Example 53, wherein similarity is determined according to at least one of a correlation coefficient or a distance metric.

Example 55. One or more computer-readable media comprising instructions that cause a computer device, in response to execution of the instructions by a processor of the computer device, to: with a hardware accelerator encoded with a logic to perform a comparison, determine if a data class in a plurality of data classes is separable, wherein determine if the data class is separable comprises determine an average intra-class similarity within each data class in the plurality of data classes, determine an inter-class similarity across all data classes, and determine separability of the data class based on the average intra-class similarity relative to the inter-class similarity; adapt a data collection based at least in part on a result obtained from the means to determine if the data class in the plurality of data classes is separable.

Example 56. The computer-readable media according to Example 55, wherein determine the average intra-class similarity within each data class comprises determine, for each data class, either i) an intra-class similarity value for all pairs of signals within a then-current class and an average of the intra-class similarity value for all pairs of signals within the then-current class, or ii) an average intra-class value of all signals within a then-current class, a similarity of each signal in the then-current class relative to the average intra-class value of all signals within the then-current class, and an average of the similarity of each signal relative to the average intra-class value for each class.

Example 57. The computer-readable media according to Example 55 or Example 56, further comprising fill a set of diagonal slots of a class separability matrix with the average intra-class similarity within each data class.

Example 58. The computer-readable media according to Example 55, wherein determine the inter-class similarity across all data classes comprises determine, for a pair of data classes in the plurality of data classes, an average inter-class similarity.

Example 59. The computer-readable media according to Example 58, wherein determine the average inter-class similarity comprises either i) determine a similarity value for each signal in a first class in the pair of data classes relative to each signal in a second class in the pair of data classes and an average of such similarity values, or ii) determine a similarity value for each signal in a first class in the pair of data classes relative to the average signal in a second class in the pair of data classes and an average of such similarity values.

Example 60. The computer-readable media according to Example 58 or Example 59, further comprising fill a set of off-diagonal slots of a class separability matrix with the inter-class similarity for each pair of data classes in the plurality of classes.

Example 61. The computer-readable media according to Example 57 and Example 60, further comprising, for each row in the class separability matrix, divide each off-diagonal slot in the row by the diagonal slot in the row and replace each off-diagonal slot with the result thereof.

Example 62. The computer-readable media according to Example 61, further comprising determine a pair of data classes to be inseparable from one another when an off-diagonal slot at the intersection of the pair of data classes in the class separability matrix has a value greater than an inter-class threshold.

Example 63. The computer-readable media according to Example 62, wherein the inter-class threshold is within a range of 0.7 to 0.9.

Example 64. The computer-readable media according to Example 55, wherein to determine separability of the data class based on the average intra-class similarity relative to the inter-class similarity determines that the pair of data classes are inseparable and further comprising means to either combine the pair of data classes into one class in the plurality of data classes for a machine learning problem or drop one of the pair of data classes for the machine learning problem.

Example 65. The computer-readable media according to Example 57, further comprising determine the data class to be highly variable when a diagonal slot of the data class in the set of diagonal slots has a value less than an intra-class threshold.

Example 66. The computer-readable media according to Example 65, wherein the intra-class threshold is 0.5.

Example 67. The computer-readable media according to Example 65, further comprising determine the result that the data class is highly variable and remove the data class from the plurality of data classes for a machine learning problem.

Example 68. The computer-readable media according to Example 55, wherein the computer device further comprises an internal sensor subsystem.

Example 69. The computer-readable media according to Example 68, wherein the instructions are further to cause the hardware accelerator to control the internal sensor subsystem.

Example 70. The computer-readable media according to Example 68, further comprising receive an identification of the plurality of data classes and collect with the internal sensor subsystem a set of signal data comprising the plurality of data classes, wherein the set of signal data have a common set of units.

Example 71. The computer-readable media according to Example 55, wherein the hardware accelerator comprises a set of artificial neurons and further comprising load pairs of signals in the artificial neurons to determine if the data class in the plurality of data classes is separable.

Example 72. The computer-readable media according to any one of Example 55 to Example 71, wherein similarity is determined according to at least one of a correlation coefficient or a distance metric.

Example 73. A computer system comprising a computer processor having at least one central processing unit ("CPU"), a hardware accelerator comprising a set of artificial neurons, and a data collector: with the computer processor, encode the set of artificial neurons with a logic to perform a comparison, use the logic to determine if a data class in a plurality of data classes is separable, wherein determine if the data class is separable comprises determine an average intra-class similarity within each data class in the plurality of data classes, determine an inter-class similarity across all data classes, and determine separability of the data class based on the average intra-class similarity relative to the inter-class similarity; with the computer processor, adapt a data collection by the data collector based at least in part on a result of determine if the data class in the plurality of data classes is separable.

Example 74. The computer system according to Example 73, wherein determine the average intra-class similarity within each data class comprises determine, for each data class, either i) an intra-class similarity value for all pairs of signals within a then-current class and an average of the intra-class similarity value for all pairs of signals within the then-current class, or ii) an average intra-class value of all signals within a then-current class, a similarity of each signal in the then-current class relative to the average intra-class value of all signals within the then-current class, and an average of the similarity of each signal relative to the average intra-class value for each class.

Example 75. The computer system according to Example 73 or Example 74, further comprising fill a set of diagonal slots of a class separability matrix with the average intra-class similarity within each data class.

Example 76. The computer system according to Example 73, wherein determine the inter-class similarity across all data classes comprises determine, for a pair of data classes in the plurality of data classes, an average inter-class similarity.

Example 77. The computer system according to Example 76, wherein determine the average inter-class similarity comprises either i) determine a similarity value for each signal in a first class in the pair of data classes relative to each signal in a second class in the pair of data classes and an average of such similarity values, or ii) determine a similarity value for each signal in a first class in the pair of data classes relative to the average signal in a second class in the pair of data classes and an average of such similarity values.

Example 78. The computer system according to Example 76 or Example 77, further comprising fill a set of off-diagonal slots of a class separability matrix with the inter-class similarity for each pair of data classes in the plurality of classes.

Example 79. The computer system according to Example 75 and Example 60, further comprising, for each row in the class separability matrix, divide each off-diagonal slot in the row by the diagonal slot in the row and replace each off-diagonal slot with the result thereof.

Example 80. The computer system according to Example 79, further comprising determine a pair of data classes to be inseparable from one another when an off-diagonal slot at the intersection of the pair of data classes in the class separability matrix has a value greater than an inter-class threshold.

Example 81. The computer system according to Example 80, wherein the inter-class threshold is within a range of 0.7 to 0.9.

Example 82. The computer system according to Example 73, wherein to determine separability of the data class based on the average intra-class similarity relative to the inter-class similarity determines that the pair of data classes are inseparable and further comprising either combine the pair of data classes into one class in the plurality of data classes for a machine learning problem or drop one of the pair of data classes for the machine learning problem.

Example 83. The computer system according to Example 75, further comprising determine the data class to be highly variable when a diagonal slot of the data class in the set of diagonal slots has a value less than an intra-class threshold.

Example 84. The computer system according to Example 83, wherein the intra-class threshold is 0.5.

Example 85. The computer system according to Example 83, further comprising determine the result that the data class is highly variable and remove the data class from the plurality of data classes for a machine learning problem.

Example 86. The computer system according to Example 73, wherein the computer device further comprises an internal sensor subsystem, wherein the internal sensor subsystem is controlled by the hardware accelerator.

Example 87. The computer system according to Example 86, further comprising receive an identification of the plurality of data classes and collect with the internal sensor subsystem a set of signal data comprising the plurality of data classes, wherein the set of signal data have a common set of units.

Example 88. The computer system according to Example 73, further comprising load pairs of signals in the artificial neurons to determine at least in part if the data class in the plurality of data classes is separable.

Example 89. The computer system according to any one of Example 73 to Example 88, wherein similarity is determined according to at least one of a correlation coefficient or a distance metric.

The invention claimed is:

1. An apparatus comprising:
   memory;
   machine readable instructions; and
   processor circuitry to execute the machine readable instructions to cause the processor circuitry to at least:
     determine a first average value for a first data class included in a plurality of data classes and a second average value for a second data class included in the plurality of data classes;
     determine a third average value corresponding to the first data class and the second data class, the processor circuitry to determine the third average value based on similarity values for respective first signals in the first data class and corresponding second signals in the second data class;
     label the first data class and the second data class with results on whether the first data class and the second data class are highly variable based on the first average value, the second average value, and the third average value;
     determine a fourth average value by dividing the third average value by the first average value and the second average value;
     label the first data class and second data class with results on whether the first data class and the second data class are inseparable based on the fourth average value; and
     adjust the plurality of data classes for a data collection process to reduce a cost of collecting data into the plurality of data classes, the processor circuitry to adjust the plurality of data classes for the data collection process by (a) removing the first data class from the plurality of data classes when the first data class is labeled as highly variable, (b) removing the second data class from the plurality of data classes when the second data class is labeled as highly variable, or (c) combining the first data class and the second data class in the plurality of data classes when the first data class and the second data class are labeled as inseparable.

2. The apparatus of claim 1, wherein the processor circuitry is to determine the first average value based on at least one of (a) first similarity values for each pair of first signals in the first data class and an average of the first similarity values, or (b) an average similarity value of all first signals in the first data class, second similarity values for each first signal in the first data class, and an average of the second similarity values relative to average intra-class values for each of the plurality of data classes.

3. The apparatus of claim 1, wherein the processor circuitry is to determine the second average value based on at least one of (a) third similarity values for each pair of second signals in the second data class and an average of the third similarity values, or (b) an average similarity value of all second signals in the second data class, fourth similarity values for each second signal in the second data class, and an average of the fourth similarity values relative to average intra-class values for each of the plurality of data classes.

4. The apparatus of claim 1, wherein the processor circuitry is to determine the third average value corresponding to the first data class and the second data class based on at least one of (a) first similarity values for respective first signals in the first data class relative to corresponding second signals in the second data class and an average of the first similarity values, or (b) second similarity values for respective first signals in the first data class relative to an average signal in the second data class and an average of the second similarity values.

5. The apparatus of claim 1, wherein the processor circuitry is to:
   in response to the first average value not satisfying a first threshold, label the first data class as highly variable; and
   in response to the second average value not satisfying the first threshold, label the second data class as highly variable.

6. The apparatus of claim 5, where in the processor circuitry is to, in response to the first average value and the second average value satisfying the first threshold and the third average value not satisfying a second threshold, label the first data class and the second data class as inseparable.

7. The apparatus of claim 1, wherein the processor circuitry is to:
   generate a class separability matrix, the class separability matrix including a list of the plurality of data classes in a first column and the list of the plurality of data classes in a first row;
   set diagonal positions in the class separability matrix with the first average value and the second average value; and
   set an off-diagonal position in the class separability matrix with the third average value across the first data class and the second data class.

8. The apparatus of claim 7, wherein the processor circuitry is to:
   determine the fourth average value by dividing the off-diagonal position in the class separability matrix by the diagonal positions; and
   replace the third average value in the off-diagonal position with the fourth average value.

9. The apparatus of claim 8, wherein the processor circuitry is to label the first data class and the second data class as inseparable when the fourth average value satisfies a threshold.

10. A tangible computer-readable storage disk or storage device comprising instructions which, when executed, cause processor circuitry to at least:
  determine a first average value for a first data class included in a plurality of data classes and a second average value for a second data class included in the plurality of data classes;
  determine a third average value corresponding to the first data class and the second data class, the processor circuitry to determine the third average value based on similarity values for respective first signals in the first data class and corresponding second signals in the second data class;
  label the first data class and the second data class with results on whether the first data class and the second data class are highly variable based on the first average value, the second average value, and the third average value;
  determine a fourth average value by dividing the third average value by the first average value and the second average value;
  label the first data class and second data class with results on whether the first data class and the second data class are inseparable based on the fourth average value; and
  adjust the plurality of data classes for a data collection process to reduce a cost of collecting data into the plurality of data classes, the processor circuitry to adjust the plurality of data classes for the data collection process by (a) removing the first data class from the plurality of data classes when the first data class is labeled as highly variable, (b) removing the second data class from the plurality of data classes when the second data class is labeled as highly variable, or (c) combining the first data class and the second data class in the plurality of data classes when the first data class and the second data class are labeled as inseparable.

11. The computer-readable storage disk or storage device of claim 10, wherein the instructions, when executed, cause the processor circuitry to determine the first average value based on at least one of (a) first similarity values for each pair of first signals in the first data class and an average of the first similarity values, or (b) an average similarity value of all first signals in the first data class, second similarity values for each first signal in the first data class, and an average of the second similarity values relative to average intra-class values for each of the plurality of data classes.

12. The computer-readable storage disk or storage device of claim 10, wherein the instructions, when executed, cause the processor circuitry to determine the second average value based on at least one of (a) third similarity values for each pair of second signals in the second data class and an average of the third similarity values, or (b) an average similarity value of all second signals in the second data class, fourth similarity values for each second signal in the second data class, and an average of the fourth similarity values relative to average intra-class values for each of the plurality of data classes.

13. The computer-readable storage disk or storage device of claim 10, wherein the instructions, when executed, cause the processor circuitry to determine the third average value corresponding to the first data class and the second data class based on at least one of (a) first similarity values for respective first signals in the first data class relative to corresponding second signals in the second data class and an average of the first similarity values, or (b) second similarity values for respective first signals in the first data class relative to an average signal in the second data class and an average of the second similarity values.

14. The computer-readable storage disk or storage device of claim 10, wherein the instructions, when executed, cause the processor circuitry to:
  in response to the first average value not satisfying a first threshold, label the first data class as highly variable; and
  in response to the second average value not satisfying the first threshold, label the second data class as highly variable.

15. The computer-readable storage disk or storage device of claim 14, wherein the instructions, when executed, cause the processor circuitry to, in response to the first average value and the second average value satisfying the first threshold and the third average value not satisfying a second threshold, label the first data class and the second data class as inseparable.

16. The computer-readable storage disk or storage device of claim 10, wherein the instructions, when executed, cause the processor circuitry to:
  generate a class separability matrix, the class separability matrix including a list of the plurality of data classes in a first column and the list of the plurality of data classes in a first row;
  set diagonal positions in the class separability matrix with the first average value and the second average value; and
  set an off-diagonal position in the class separability matrix with the third average value across the first data class and the second data class.

17. The computer-readable storage disk or storage device of claim 16, wherein the instructions, when executed, cause the processor circuitry to:
  determine the fourth average value by dividing the off-diagonal position in the class separability matrix by the diagonal positions; and
  replace the third average value in the off-diagonal position with the fourth average value.

18. The computer-readable storage disk or storage device of claim 17, wherein the instructions, when executed, cause the processor circuitry to label the first data class and the second data class as inseparable when the fourth average value satisfies a threshold.

19. A computer system comprising:
  separability module circuitry to:
    determine a first average value for a first data class included in a plurality of data classes and a second average value for a second data class included in the plurality of data classes;
    determine a third average value corresponding to the first data class and the second data class, the separability module circuitry to determine the third average value based on similarity values for respective first signals in the first data class and corresponding second signals in the second data class;
    label the first data class and the second data class with results on whether the first data class and the second data class are highly variable based on the first average value, the second average value, and the third average value;
    determine a fourth average value by dividing the third average value by the first average value and the second average value;

label the first data class and second data class with results on whether the first data class and the second data class are inseparable based on the fourth average value; and output and implementation module circuitry to adjust the plurality of data classes for a data collection process to reduce a cost of collecting data into the plurality of data classes, the output and implementation module circuitry to adjust the plurality of data classes for the data collection process by (a) removing the first data class from the plurality of data classes when the first data class is labeled as highly variable, (b) removing the second data class from the plurality of data classes when the second data class is labeled as highly variable, or (c) combining the first data class and the second data class in the plurality of data classes when the first data class and the second data class are labeled as inseparable.

20. The computer system of claim 19, wherein the separability module circuitry is to determine the first average value based on at least one of (a) first similarity values for each pair of first signals in the first data class and an average of the first similarity values, or (b) an average similarity value of all first signals in the first data class, second similarity values for each first signal in the first data class, and an average of the second similarity values relative to average intra-class values for each of the plurality of data classes.

21. The computer system of claim 19, wherein the separability module circuitry is to:

determine the second average value based on at least one of (a) third similarity values for each pair of second signals in the second data class and an average of the third similarity values, or (b) an average similarity value of all second signals in the second data class, fourth similarity values for each second signal in the second data class, and an average of the fourth similarity values relative to average intra-class values for each of the plurality of data classes; and determine the third average value corresponding to the first data class and the second data class based on at least one of (a) first similarity values for respective first signals in the first data class relative to corresponding second signals in the second data class and an average of the first similarity values, or (b) second similarity values for respective first signals in the first data class relative to an average signal in the second data class and an average of the second similarity values.

* * * * *